United States Patent
Kwak (12)

(10) Patent No.: US 6,311,097 B2
(45) Date of Patent: Oct. 30, 2001

(54) FAULT DIAGNOSIS SYSTEM AND METHOD FOR DIAGNOSING A FAULT OF AN EMBROIDERY MACHINE

(75) Inventor: Su Moon Kwak, Inchon (KR)

(73) Assignee: Sunstar Precision Co., Ltd., Inchon (KR)

( * ) Notice: Subject to any disclaimer, the term of this patent is extended or adjusted under 35 U.S.C. 154(b) by 0 days.

(21) Appl. No.: 09/825,779

(22) Filed: Apr. 4, 2001

(30) Foreign Application Priority Data

Apr. 4, 2000 (KR) .................................................. 00-17667
Mar. 23, 2001 (KR) .................................................. 01-15317

(51) Int. Cl.[7] .............................. D05B 19/12; D05C 5/02
(52) U.S. Cl. ................. 700/138; 112/102.5; 112/470.04; 112/475.19
(58) Field of Search .................................... 700/138, 136, 700/137; 112/102.5, 470.04, 470.06, 470.01, 475.19, 445; 345/347

(56) References Cited

U.S. PATENT DOCUMENTS 4,480,561 * 11/1984 Makabe et al. ....................... 112/445
5,359,949    11/1994 Asano .
6,123,037     9/2000 Shimizu .
6,216,618 *   4/2001 Goldberg et al. ................ 700/138 X

* cited by examiner

Primary Examiner—Peter Nerbun
(74) Attorney, Agent, or Firm—Akin, Gump, Strauss, Hauer & Feld, L.L.P.

(57) ABSTRACT

A method for diagnosing a fault of a embroidery machine, includes the steps of: (a) indicating that an embroidery operation is stopped by the fault of the embroidery machine and displaying a web-browser drive guide message; (b) displaying a fault diagnosis-dedicated web-page in response to a web-browser drive signal inputted by an operator; (c) transmitting fault-related information, inputted into the fault diagnosis-dedicated web-page by the operator, from an embroidery system to a server computer system; and (d) transmitting the fault diagnosis-dedicated web-page from a server computer system to the embroidery system, diagnosing the fault of the embroidery machine by employing the fault-related information inputted into the fault diagnosis-dedicated web-page in order to generate fault diagnosis information, and transmitting the fault diagnosis information to the embroidery system.

46 Claims, 7 Drawing Sheets

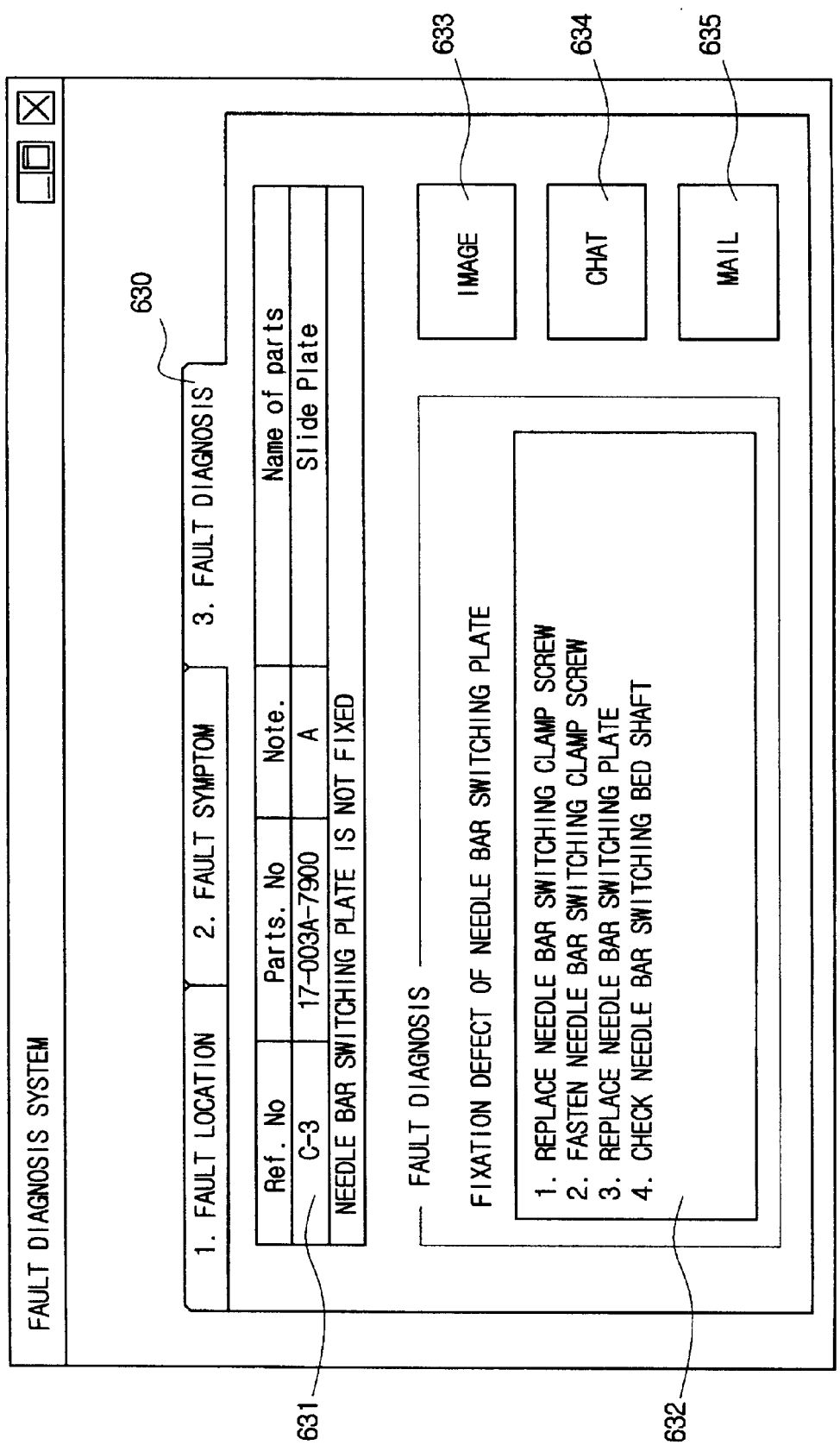

FAULT DIAGNOSIS SYSTEM AND METHOD FOR DIAGNOSING A FAULT OF AN EMBROIDERY MACHINE

FIELD OF THE INVENTION

The present invention relates to a fault diagnosis system based on a communication network. More particularly, the present invention relates to a fault diagnosis system and method for diagnosing a fault of an embroidery machine.

DESCRIPTION OF THE PRIOR ART

Generally, an embroidery system comprises an embroidery operation program for automatically embroidering an embroidery design. The embroidery system includes a storage, an input unit, a controller, an embroidery machine, and a fault detector. The storage stores a embroidery design data. The input unit inputs an embroidery design selection signal, and an embroidery operation start/stop signal from the operator. The controller controls the embroidery machine in response to an operator's request. The embroidery machine embroiders the selected embroidery design. The fault detector detects the fault of the embroidery machine if the embroidery operation is stopped by the fault of the embroidery machine.

Where the operator inputs the selected embroidery design and the embroidery operation start signal, the controller controls the embroidery operation program stored in the storage to embroider the selected embroidery design. If the embroidery operation is stopped by the fault of the embroidery machine, the controller controls the display unit for displaying a fault message of the embroidery machine. The operator should repair the embroidery machine after checking the fault message. However, where the operator can not repair the embroidery machine, the operator makes a phone call to a manager of service center in order to request a repair service.

In case of request of on-site repair by the operator, the manager shall correctly understand the fault of the embroidery machine so as to bring a correct embroidery part for repair. However the operator may not know which embroidery-part is broken. Even though the operator notices the correct fault embroidery-part, the operator may not know the embroidery-part name. If so, the operator may not explain the embroidery fault-related information to the manager in detail and that the manager may misunderstand the fault of the embroidery machine.

In this situation, if the manager may bring a wrong embroidery part for on-site repair, the manager returns to the service center to bring correct embroidery part. Furthermore, in case that the operator recognizes the fault of the embroidery machine, an unnecessary on-site repair may occur.

As above, there is a problem that the manager incorrectly diagnoses the fault of the embroidery machine in case that the operator incorrectly explains the fault-related information to the manager. Accordingly, there is strongly needed a fault diagnosis system for efficiently diagnosing the fault of the embroidery machine.

SUMMARY OF THE INVENTION

It is, therefore, an object of the present invention to provide a fault diagnosis system and method for efficiently diagnosing a fault of an embroidery machine by employing a server computer system through a communication network in case that an embroidery operation is stopped by the fault of the embroidery machine.

In accordance with a first aspect of the present invention, there is provided a fault diagnosis system for diagnosing a fault of an embroidery machine, comprising: a communication network; an embroidery system coupled to the communication network for indicating that an embroidery operation is stopped by the fault of the embroidery machine, displaying a web-browser drive guide message, displaying a fault diagnosis-dedicated web-page received from the communication network in response to a web-browser drive signal inputted by an operator, and transmitting fault-related information, inputted into the fault diagnosis-dedicated web-page by the operator, to the communication network; and a server computer system coupled to the communication network for providing the fault diagnosis-dedicated web-page to the communication network, diagnosing the fault of the embroidery machine by employing the fault-related information inputted into the fault diagnosis-dedicated web-page in order to generate fault diagnosis information, and transmitting the fault diagnosis information to the embroidery system through the communication network.

In accordance with a second aspect of the present invention, there is provided a method for diagnosing the fault of the embroidery machine, comprising the steps of: (a) detecting that an embroidery operation is stopped by the fault of the embroidery machine and displaying a web-browser drive guide message; (b) displaying a fault diagnosis-dedicated web-page in response to a web-browser drive signal inputted by an operator; (c) transmitting fault-related information, inputted into the fault diagnosis-dedicated web-page by the operator, from an embroidery system to a server computer system; and (d) transmitting the fault diagnosis-dedicated web-page from a server computer system to the embroidery system, diagnosing the fault of the embroidery machine by employing the fault-related information inputted into the fault diagnosis-dedicated web-page in order to generate fault diagnosis information, and transmitting the fault diagnosis information to the embroidery system.

In accordance with a third aspect of the present invention, there is provided a computer-readable medium storing program instructions, the program instructions disposed on a computer to perform a method for diagnosing the fault of the embroidery machine, comprising the steps of: (a) indicating that an embroidery operation is stopped by the fault of the embroidery machine and displaying a web-browser drive guide message; (b) displaying a fault diagnosis-dedicated web-page in response to a web-browser drive signal inputted by an operator; (c) transmitting fault-related information, inputted into the fault diagnosis-dedicated web-page by the operator, from an embroidery system to a server computer system; and (d) transmitting the fault diagnosis-dedicated web-page from a server computer system to the embroidery system, diagnosing the fault of the embroidery machine by employing the fault-related information inputted into the fault diagnosis-dedicated web-page in order to generate fault diagnosis information, and transmitting the fault diagnosis information to the embroidery system.

BRIEF DESCRIPTION OF THE DRAWINGS

The above and other objects and features of the instant invention will become apparent from the following description of preferred embodiments taken in conjunction with the accompanying drawings, in which:

FIG. 8 is further another exemplary view illustrating a web-page provided by the server computer system shown in FIG. 1.

DETAILED DESCRIPTION OF THE INVENTION

Figure 1:
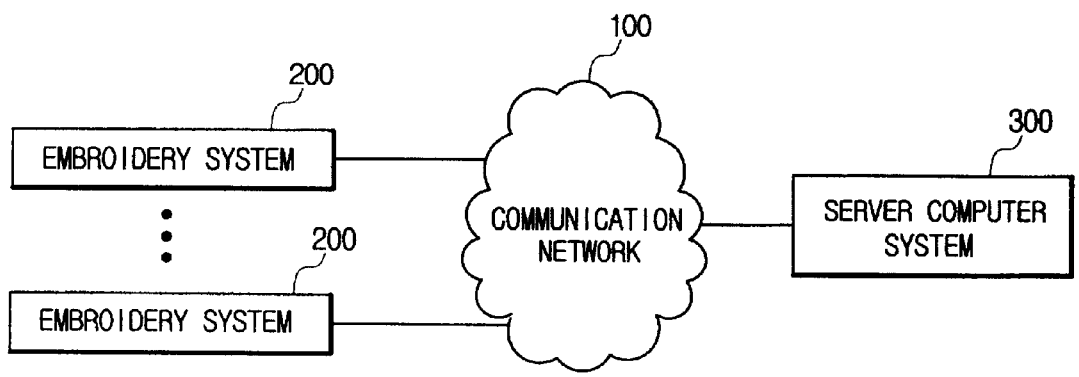
FIG. 1 is an exemplary block diagram illustrating a fault diagnosis system for diagnosing a fault of an embroidery machine.

Referring to FIG. 1, there is shown a fault diagnosis system for diagnosing a fault of an embroidery machine. The fault diagnosis system comprises a communication network 100, an embroidery system 200, and a server computer system 300.

As shown, the embroidery system 200 coupled to the communication network 100 indicates that an embroidery operation is stopped by the fault of the embroidery machine, and displays a web-browser drive guide message. Where an operator of the embroidery system 200 inputs a web-browser drive signal in response to the web-browser drive guide message, a fault diagnosis-dedicated web-page received from the server computer system 300 is displayed. The operator inputs the fault-related information of the embroidery system 200 into the fault diagnosis-dedicated web-page. The inputted fault-related information is transmitted to the server computer system 300 by the embroidery system 200 through the communication network 100.

The server computer system 300 provides the fault diagnosis-dedicated web-page to the embroidery system 200 through the communication network 100. Further, the server computer system 200 diagnoses the fault of the embroidery machine by employing the fault-related information inputted into the fault diagnosis-dedicated web-page in order to generate fault diagnosis information. Furthermore, the server computer system 300 transmits the fault diagnosis information to the embroidery system 200 through the network 100.

Figure 2:
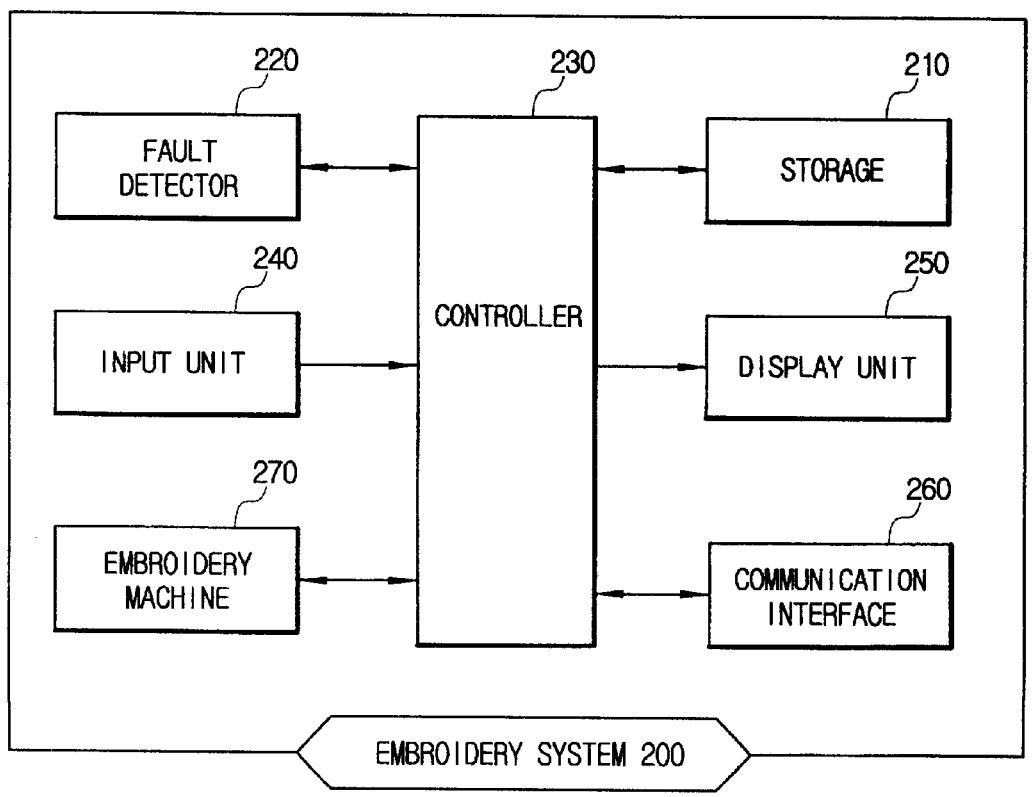
FIG. 2 is an exemplary block diagram illustrating an embroidery system shown in FIG. 1.

Referring to FIG. 2, there is shown that the embroidery system 200 includes a storage 210, a fault detector 220, a controller 230, an input unit 240, a display unit 250, a communication interface 260, and an embroidery machine 270. As shown, the storage 210 has a web browser coupled to the server computer system 300, and stores the fault diagnosis information from the server computer system 300 through the web browser. The fault detector 220 detects a fault of the embroidery machine 270 if the embroidery operation is stopped by the fault of the embroidery machine 270. Then, the fault detector 220 produces and transmits a fault detection signal to the controller 230. The controller 230 outputs the web-browser drive guide message in response to the fault detection signal, and drives the web browser for connecting the embroidery system 200 to the server computer system 300. The input unit 240 inputs the web-browser drive signal from the operator. The display unit 250 displays the fault detection signal, the web-browser drive guide message, and the fault diagnosis-dedicated web-page from the server computer system 300. The communication interface 260 receives the fault diagnosis information from the server computer system 300, and transmits the fault-related information, inputted by the operator, to the server computer system 300.

Figure 3:
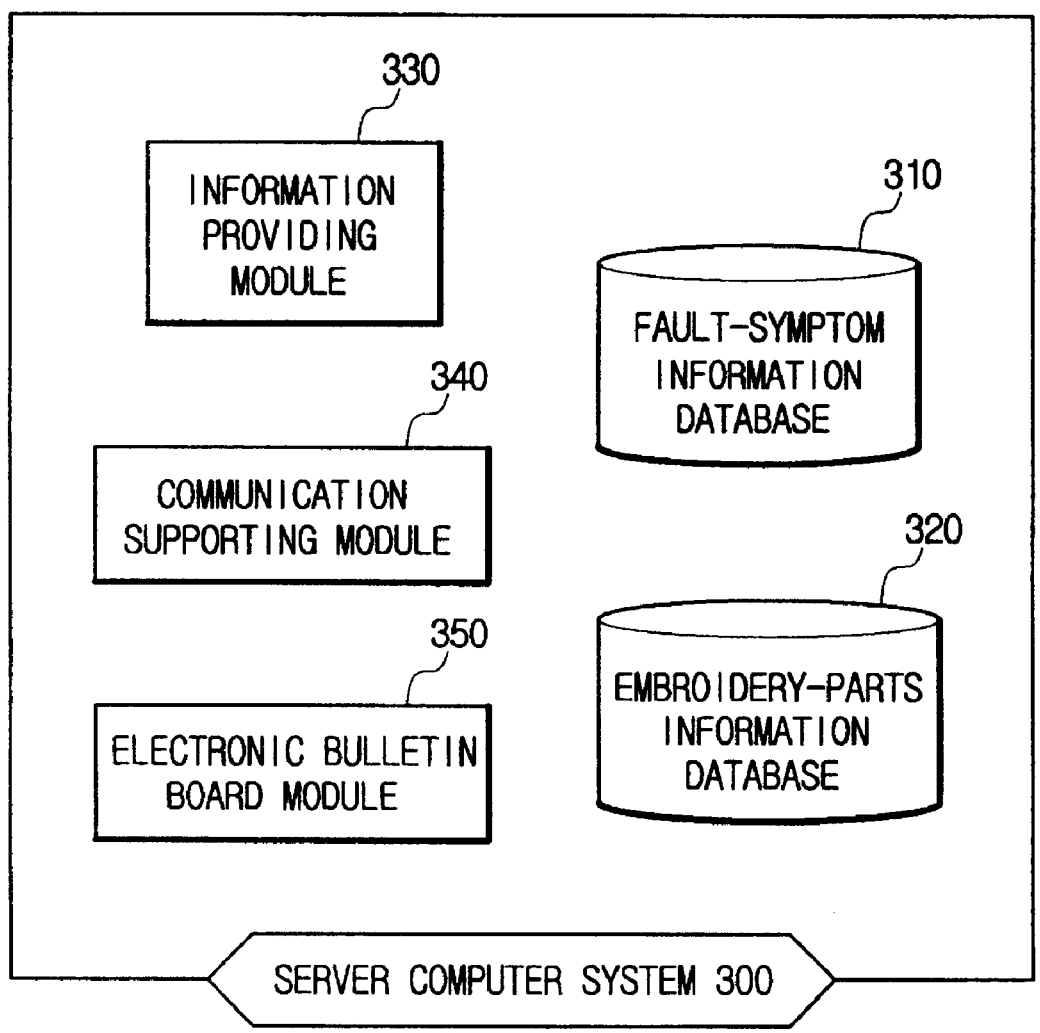
FIG. 3 is an exemplary block diagram illustrating a server computer system shown in FIG. 1.
Figure 4:
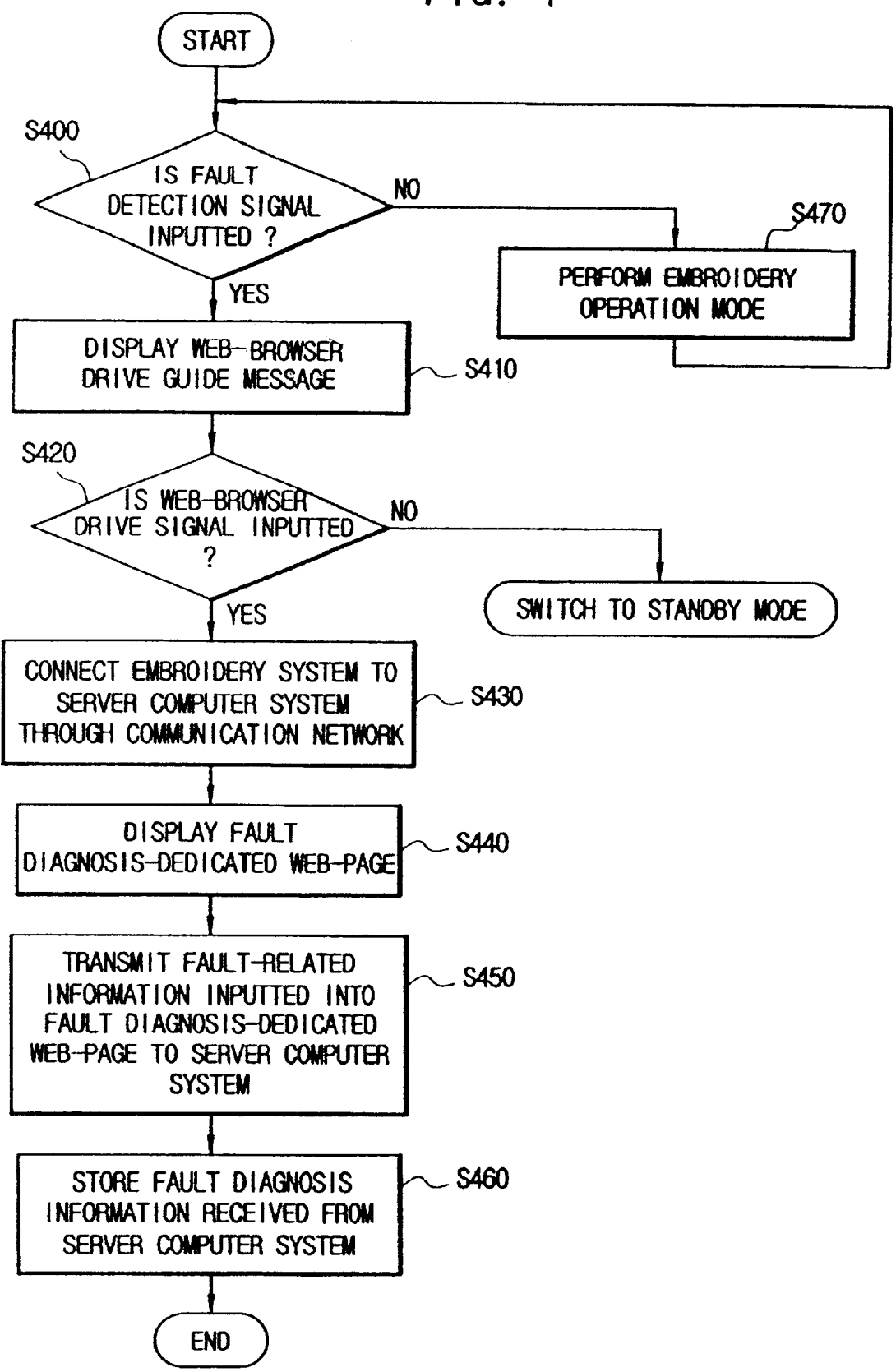
FIG. 4 is a flow chart illustrating a method for diagnosing the fault of the embroidery machine.

Referring to FIG. 3, the server computer system 300 as a service center server includes a fault-symptom information database 310, an embroidery-parts information database 320, an information providing module 330, a communication supporting module 340, and an electronic bulletin board module 350.

As shown, the fault-symptom information database 310 classifies and stores the fault symptom information inputted into the fault diagnosis-dedicated web-page by the operator. The embroidery-parts information database 320 classifies and stores an embroidery-parts information of embroidery parts configuring the embroidery machine 270. The information providing module 330 provides the fault diagnosis-dedicated web-page to the embroidery system 200 and provides the fault symptom information to the fault-symptom information database 310. The communication supporting module 340 supports a communication between the operator at the embroidery system 200 and a manager at server computer system 300. The communication supporting module 340 also supports a chatting and a moving picture for the sake of the communication between the operator at the embroidery system 200 and the manager at the server computer system 300 so that the fault of the embroidery machine 270 is diagnosed through a chatting and a moving picture. The electronic bulletin board module 350 registers an embroidery-part purchase request message and the embroidery fault diagnosis request message inputted by the operator, and also registers a response message, with respect to the embroidery-part purchase request message and the embroidery fault diagnosis request message, to provide the operator with the response message.

Figure 6:
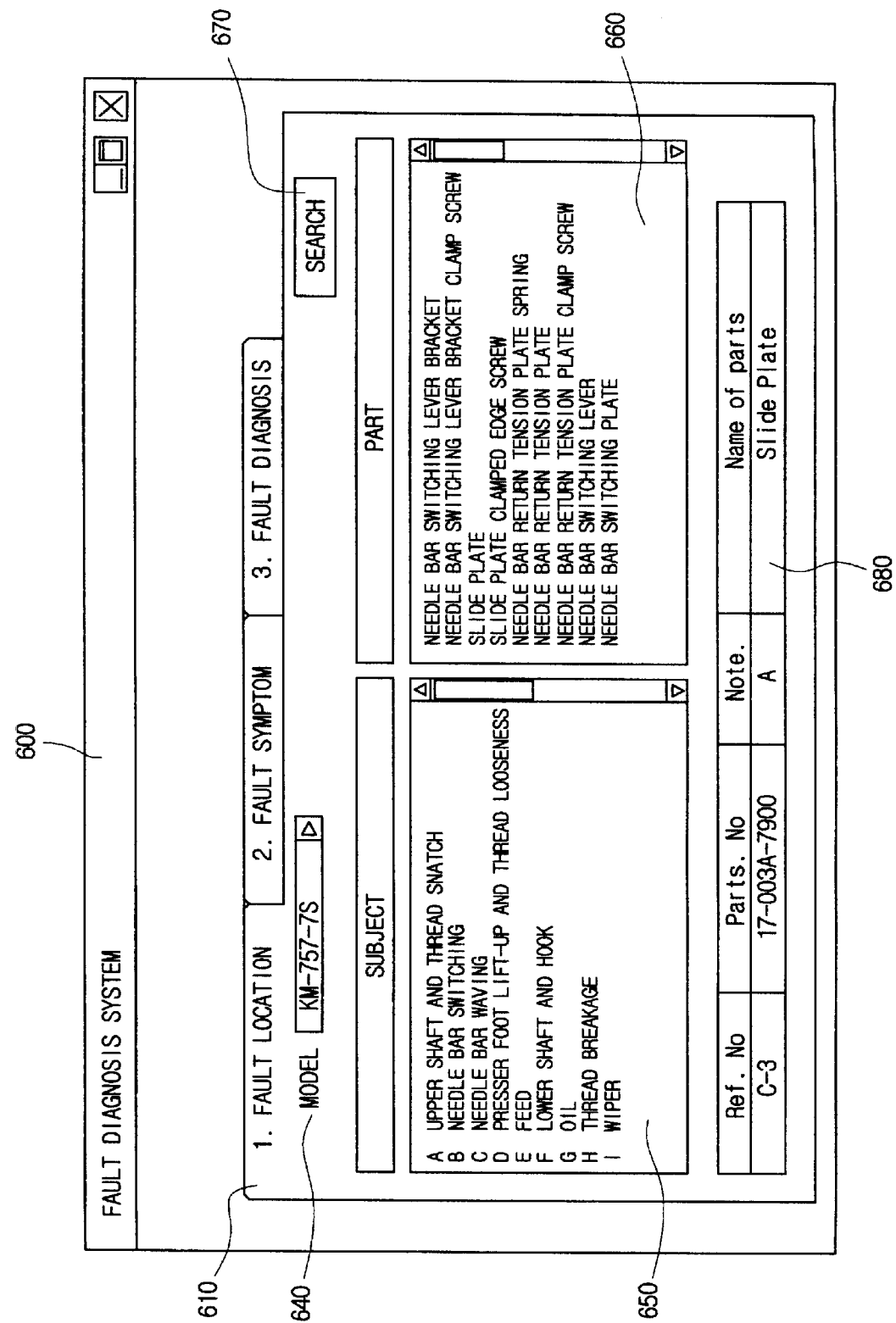
FIG. 6 is an exemplary view illustrating a web-page provided by the server computer system shown in FIG. 1.
Figure 7:
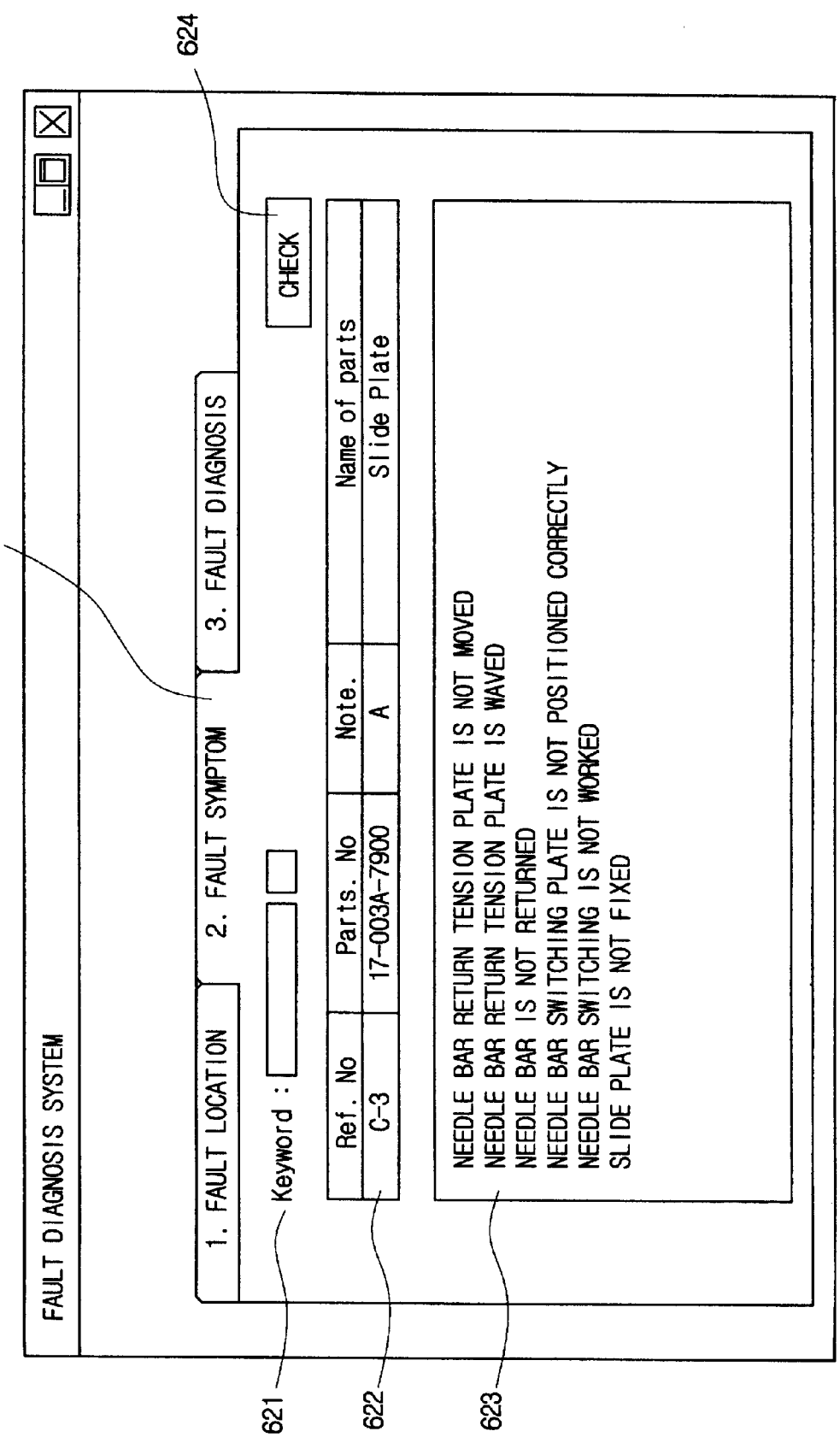
FIG. 7 is another exemplary view illustrating a web-page provided by the server computer system shown in FIG. 1.

Referring to FIGS. 6 to 8, the fault diagnosis-dedicated web-page 600 includes a fault location search page 610, a fault symptom providing page 620, and a fault diagnosis page 630.

Referring to FIG. 6, the fault location search page 610 provides a fault part list 660 to indicate the fault location. The fault location search page 610 includes a model name list box 640, a fault subject box 650, a fault part list box 660, and a search button 670. The fault subject box 650 displays a list of fault subject names. The fault part list box 660 displays fault embroidery-part names when the operator selects one fault subject name in the list of the fault subject names. If the search button 670 is clicked, the fault symptom providing page 620 provides a fault symptom list. The fault symptom providing page 620 is linked to the fault diagnosis page 630 providing a fault diagnosis message.

Referring to FIG. 8, the fault diagnosis page 630 includes a moving picture menu item 633, a chatting menu item 634, and an e-mail menu item 635. The moving picture menu item 633 is clicked by the operator so that a moving picture of a fault processing, accomplished by the manager at the server computer system 300, is provided. The chatting menu item 634 is clicked by the operator so that the communication between the operator and the manager is accomplished in a real-time chatting. The e-mail menu item 635 is clicked by the operator so that the operator can communicate with the manager in an e-mail.

Referring to FIGS. 2 to 8, there is shown a fault diagnosis method for diagnosing a fault of the embroidery machine.

First, if the operator presses a turn-on key to start the embroidery operation with the input unit 240, the controller 230 initializes the embroidery system 200. At step S400, the controller 230 determines whether there is a fault detection signal received from the fault detector 220. If there is not the fault detection signal received from the fault detector 220, at step S470, the embroidery machine 270 performs an embroidery operation mode.

Otherwise, if there is a fault detection signal received from the fault detector 220, at step S410, the display unit 250 displays the web-browser drive guide message through the controller 230.

At step S420, the controller 230 determines whether there is the web-browser drive signal received from the input unit 240. If there is not the web-browser drive signal received from the input unit 240, the embroidery system 200 is switched to a standby mode.

Otherwise, if there is the web-browser drive signal received from the input unit 240, at step S430, the embroidery system 200 is connected to the server computer system 300 through the communication network 100.

At step S440, the display unit 250 displays the fault diagnosis-dedicated web-page 600 from the server computer system 300 through the communication interface 260.

The operator inputs the fault-related information of the embroidery system 200 into the fault diagnosis-dedicated webpage 600. At step S450, the communication interface 260 transmits the fault-related information inputted into the fault diagnosis-dedicated web-page 600 from the embroidery system 200 to the server computer system 300. At step S460, the server computer system 300 diagnoses the fault of the embroidery machine by employing the fault-related information inputted into the fault diagnosis-detected web-page 600. Then, the server computer system 300 generates and transmits the fault diagnosis information to the embroidery system 200. Further, the embroidery system 200 stores the fault diagnosis information in the storage 210.

The steps S450 and S460 are explained in detail in FIGS. 6 to 8. First, referring to FIG. 6, the controller 230 controls the display unit 250 for displaying the fault diagnosis-dedicated web-page 600 from the server computer system 300 through the communication interface 260.

At the fault location search page 610, the operator selects the model name in the model name list box 640. Then, the fault subject list box 650 displays the fault subject list automatically in response to the inputted the model name. In case that the operator selects the fault subject at the fault subject list box 650, the fault part list box 660 displays the fault part list in response to the selected fault subject automatically. After selecting the fault embroidery-part in the fault parts list box 660, the operator clicks the search button 670. Then, the fault system providing page 620 is displayed. The fault location search page 610 also includes a table 680. The table 680 is composed of 4 boxes, which are Ref .No. box, Parts No. box, Note box, and Name of parts box. The table 680 is filled out automatically in response to the selected fault-related information at the fault location search page 610.

Referring to FIG. 7, the fault symptom providing page 620 includes a keyword input box 621, a table 622, a fault symptom list box 623, and a check button 624. The fault symptom list box 623 displays a fault symptom list in response to the inputted information into the fault location page 610. In case that the operator inputs a keyword into the keyword inputting box 621, the fault symptom list box 623 displays the fault symptom list in response to the inputted keyword. The table 622 is the same as the table 680 of the fault location page 610. After the fault symptom list box 623 displays the fault symptoms, the operator selects the fault symptom of the embroidery system 200, and the check button 624. Then the fault diagnosis page 630 is displayed.

Referring to FIG. 8, the fault diagnosis page 630 includes a table 631, and a fault diagnosis box 632, an image menu item 633, a chatting menu item 634, and an e-mail menu item 635.

The table 631 includes 5 boxes. Ref.No.Box, Parts No.box, Note box, and Name of parts box display same as the table 680 and the table 622. A fault symptom box displays the selected fault symptom of the embroidery machine 270 in the fault symptom providing page 620. The fault diagnosis box 632 displays a fault diagnosis list in response to the inputted information of the fault symptom page 620. Finally, the fault diagnosis information is transmitted from the server computer system 300 to the embroidery system 200. The fault diagnosis information is transmitted in the form of a moving picture file, image file and/or a document. Also the operator communicates with the manager at the server computer system 300. The moving picture menu item 633 provides the moving picture of a fault processing accomplished by the manager at the server computer system 300. The operator also produces the fault-related information in the form of the moving picture file with a video tape recorder or a digital still camera, and transmits the fault-related information in the form of the moving picture file to the server computer system 300. The chatting menu item 634 provides a real-time chatting so that the communication between the operator and the manager is accomplished. The e-mail menu item 635 provides an e-mail so that the operator can communicate with the manager. Thus, the manager transmits the fault diagnosis information from the server computer system 300 to the embroidery system 200.

In the meantime, the server computer system 300 provides the fault diagnosis information to the embroidery system 200. Namely, referring to FIGS. 6 to 8, the server computer system 300 must program the fault diagnosis-dedicated web-page for providing the fault diagnosis information, which includes the fault location search page 610, the fault symptom providing page 620, and the fault diagnosis page 630. Furthermore, the service computer system 300 shall include the fault symptom database 310, the embroidery-parts information database 320, the information providing module 330, the communication supporting module 340, and the electronic bulletin board module 350.

Figure 5:
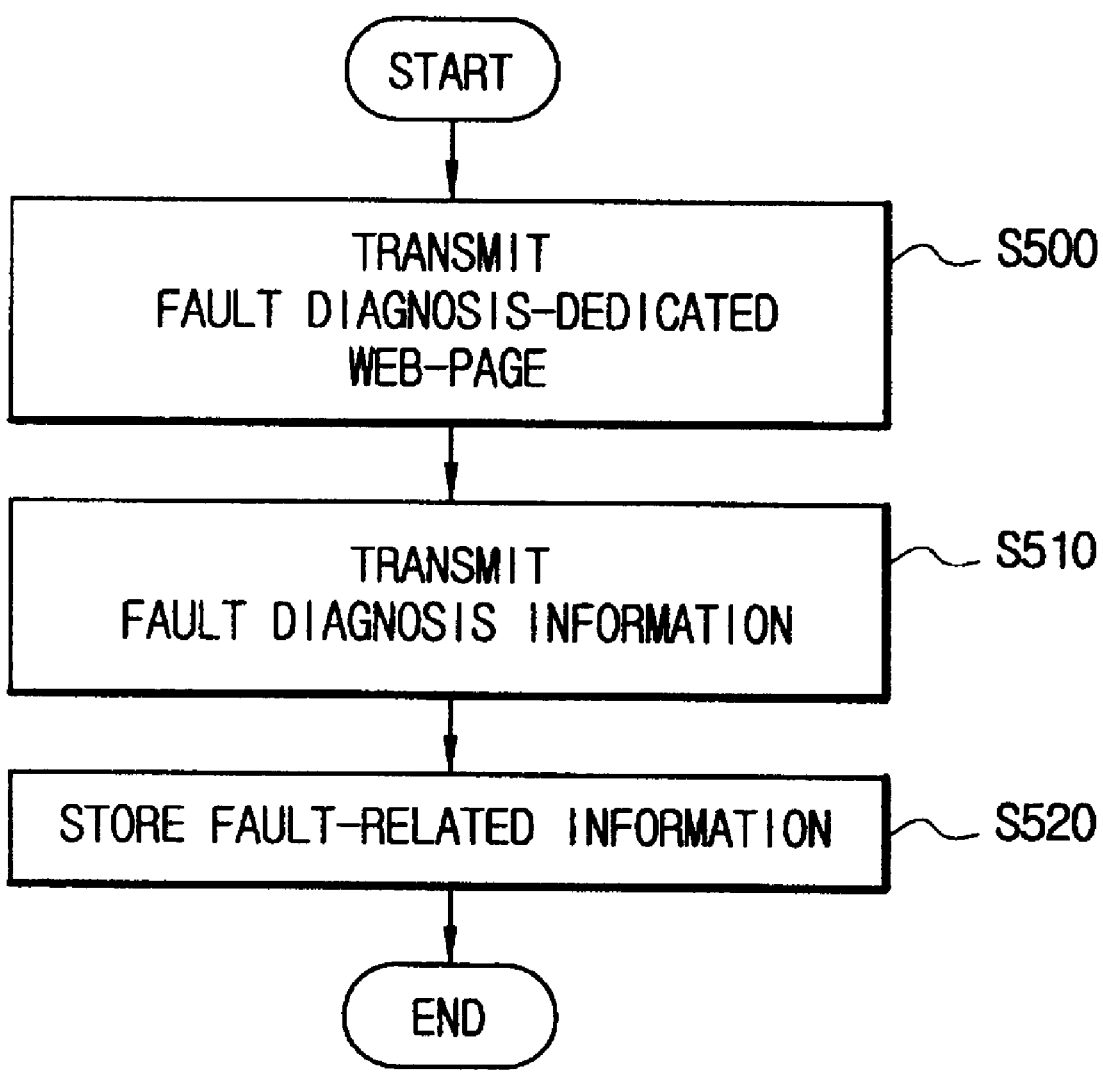
FIG. 5 is a flow chart illustrating an operation of the server computer system for diagnosing the fault of the embroidery machine.

Referring to FIG. 5, there is shown the fault diagnosis method for diagnosing the fault of the embroidery machine at server computer system 300. At step S500, the information providing module 330 transmits the fault diagnosis-dedicated web-page from the server computer system 300 to the embroidery, system 200 in response to the web-browser drive signal inputted by the operator. The operator, at step S510, inputs the fault-related information into the fault diagnosis-dedicated web-page, then the information providing module 330 provides the fault symptom information to the database. At step S520, the information providing module 330 operates with the communication supporting module 340 and the electronic bulletin board module 350 in sequence operation, and the electronic bulletin board module 350 stores the fault-related information in the fault symptom information database 320, which is inputted from the embroidery system.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A fault diagnosis system for diagnosing an fault of an embroidery machine, comprising:

a communication network;

an embroidery system coupled to the communication network for indicating that an embroidery operation is stopped by the fault of the embroidery machine, displaying a web-browser drive guide message, displaying a fault diagnosis-dedicated web-page received from the communication network in response to a web-browser drive signal inputted by an operator, and transmitting fault-related information, inputted into the fault diagnosis-dedicated web-page by the operator, to the communication network; and a server computer system coupled to the communication network for providing the fault diagnosis-dedicated web-page to the communication network, diagnosing the fault of the embroidery machine by employing the fault-related information inputted into the fault diagnosis-dedicated web-page in order to generate fault diagnosis information, and transmitting the fault diagnosis information to the embroidery system through the communication network.

2. The fault diagnosis system as recited in claim 1, wherein the embroidery system includes:

a storage means, having a web browser coupled to the server computer system, for storing the fault diagnosis information from the server computer system through the web browser;

a fault detector for producing a fault detection signal when the embroidery operation is stopped by the fault of the embroidery machine;

a controller for outputting the web-browser drive guide message in response to the fault detection signal, and driving the web browser to connect the embroidery system to the server computer system in response to the web-browser drive signal inputted from an operator at the embroidery system;

an input means for inputting the web-browser drive signal from the operator;

a display means for displaying the web-browser drive guide message, the fault detection signal and the fault diagnosis-dedicated web-page outputted from the server computer system; and a communication interface means for receiving the fault diagnosis information from the server computer and transmitting the fault-related information, inputted by the operator, to the server computer system.

3. The fault diagnosis system as recited in claim 2, wherein the fault-related information includes one of a moving picture file, an image file and a document.

4. The fault diagnosis system as recited in claim 2, wherein the fault-related information is produced by a video tape recorder or a digital still camera.

5. The fault diagnosis system as recited in claim 2, wherein the fault-related information is stored in the storage means.

6. The fault diagnosis system as recited in claim 2, wherein the fault-related information is provided by a scanner.

7. The fault diagnosis system as recited in claim 1, wherein the server computer system further includes:

a fault-symptom information database for classifying and storing fault symptom information inputted into the fault diagnosis-dedicated web-page by the operator; and an information providing means for providing the fault diagnosis-dedicated web-page to the embroidery system and providing the fault symptom information to the database.

8. The fault diagnosis system as recited in claim 7, further comprising:

an embroidery-parts information database for classifying and storing embroidery-parts information of the embroidery parts configuring the embroidery machine.

9. The fault diagnosis system as recited in claim 7, further comprising:

a communication supporting means for supporting a communication between the operator at the embroidery system and a manager at the server computer system.

10. The fault diagnosis system as recited in claim 9, wherein the communication supporting means supports a chatting and a moving picture for the sake of the communication between the operator at the embroidery system and the manager at the server computer system so that the fault of the embroidery machine is diagnosed through a chatting and a moving picture.

11. The fault diagnosis system as recited in claim 7, further comprising:

an electronic bulletin board for registering an embroidery-part purchase request message and an embroidery fault diagnosis request message inputted by the operator, and registering a response message, with respect to the embroidery-part purchase request message and the embroidery fault diagnosis request message, to provide the operator with the response message.

12. The fault diagnosis system as recited in claim 7, wherein the fault diagnosis-dedicated web-page includes:

a fault location search page for providing a fault part list to indicate the fault location after selecting an embroidery machine model name and a fault subject name;

a fault symptom providing page for providing a fault symptom list when the operator selects one fault embroidery-part in the fault part list and a search button on the fault location search page; and a fault diagnosis page for providing a fault diagnosis message when the operator selects one fault symptom in the fault symptom list and a check button on the fault symptom providing page.

13. The fault diagnosis system as recited in claim 12, wherein the fault diagnosis-dedicated web-page includes:

a moving picture menu item for providing a moving picture of a fault processing accomplished by a manager at the server computer system.

14. The fault diagnosis system as recited in claim 13, wherein the fault diagnosis-dedicated web-page includes:

a chatting menu item for providing a real-time chatting so that the communication between the operator and the manager is accomplished.

15. The fault diagnosis system as recited in claim 13, wherein the fault diagnosis-dedicated web-page includes:

an e-mail menu item for providing an e-mail so that the operator can communicate with the manager.

16. The fault diagnosis system as recited in claim 14, wherein the fault diagnosis-dedicated web-page includes:

an e-mail menu item for providing an e-mail so that the operator can communicate with the manager.

17. A method for diagnosing a fault of an embroidery machine, comprising the steps of:
   (a) detecting that an embroidery operation is stopped by the fault of the embroidery machine and displaying a web-browser drive guide message;
   (b) displaying a fault diagnosis-dedicated web-page in response to a web-browser drive signal inputted by an operator;
   (c) transmitting fault-related information, inputted into the fault diagnosis-dedicated web-page by the operator, from an embroidery system to a server computer system; and
   (d) transmitting the fault diagnosis-dedicated web-page from a server computer system to the embroidery system, diagnosing the fault of the embroidery machine by employing the fault-related information inputted into the fault diagnosis-dedicated web-page in order to generate fault diagnosis information, and transmitting the fault diagnosis information to the embroidery system.

18. The method as recited in claim 17, wherein the fault-related information includes one of a moving picture file, an image file and a document.

19. The method as recited in claim 18, wherein the fault-related information is produced by a video tape recorder or a digital still camera.

20. The method as recited in claim 18, wherein the fault-related information is provided by a scanner.

21. The method as recited in claim 20, wherein the fault-related information is stored in a storage.

22. The method as recited in claim 17, further comprising the step of:
   (e) classifying and storing fault symptom information, inputted into the fault diagnosis-dedicated web-page by the operator, in a fault-symptom information database.

23. The method as recited in claim 17, further comprising the step of:
   (f) classifying and storing embroidery-parts information of embroidery parts of the embroidery machine configuring the embroidery machine in an embroidery-parts information database.

24. The method as recited in claim 7, further comprising the step of:
   (g) supporting a communication between the operator at the embroidery system and a manager at the server computer system.

25. The method as recited in claim 24, wherein the step (g) includes the step of:
   supporting a chatting and a moving picture for the sake of the communication between the operator at the embroidery system and the manager at the server computer system so that the fault of the embroidery machine is diagnosed through a chatting and a moving picture.

26. The method as recited in claim 17, further comprising:
   (h) registering an embroidery-part purchase request message and an embroidery fault diagnosis request message inputted by the operator, and registering a response message, with respect to the embroidery-part purchase request message and the embroidery fault diagnosis request message, to provide the operator with the response message.

27. The method as recited in claim 17, wherein the fault diagnosis-dedicated web-page includes:
   a fault location search page for providing a fault part list to indicate the fault location after selecting an embroidery machine model name and a fault subject name;
   a fault symptom providing page for providing a fault symptom list when the operator selects one fault embroidery-part in the fault part list and a search button on the fault location search page; and
   a fault diagnosis page for providing a fault diagnosis message when the operator selects one fault symptom in the fault symptom list and a check button on the fault symptom providing page.

28. The method as recited in claim 17, wherein the fault diagnosis-dedicated web-page includes:
   a moving picture menu item for providing a moving picture of a fault processing accomplished by a manager at the server computer system.

29. The method as recited in claim 28, wherein the fault diagnosis-dedicated web-page includes:
   a chatting menu item for providing a real-time chatting so that the communication between the operator and the manager is accomplished.

30. The method as recited in claim 28, wherein the fault diagnosis-dedicated web-page includes:
   an e-mail menu item for providing an e-mail so that the operator can communicate with the manager.

31. The method as recited in claim 29, wherein the fault diagnosis-dedicated web-page includes:
   an e-mail menu item for providing an e-mail so that the operator can communicate with the manager.

32. A computer-readable medium storing program instructions, the program instructions disposed on a computer to perform a method for diagnosing a fault of an embroidery machine, comprising the steps of:
   (a) indicating that an embroidery operation is stopped by the fault of the embroidery machine and displaying a web-browser drive guide message;
   (b) displaying a fault diagnosis-dedicated web-page in response to a web-browser drive signal inputted by an operator;
   (c) transmitting fault-related information , inputted into the fault diagnosis-dedicated web-page by the operator, from an embroidery system to a server computer system; and
   (d) transmitting the fault diagnosis-dedicated web-page from a server computer system to the embroidery system, diagnosing the fault of the embroidery machine by employing the fault-related information inputted into the fault diagnosis-dedicated web-page in order to generate fault diagnosis information, and transmitting the fault diagnosis information to the embroidery system.

33. The computer-readable medium as recited in claim 32, wherein the fault-related information includes one of a moving picture file, an image file and a document.

34. The computer-readable medium as recited in claim 33, wherein the fault-related information is produced by a video tape recorder or a digital still camera.

35. The computer-readable medium as recited in claim 33, wherein the fault-related information is provided by a scanner.

36. The computer-readable medium as recited in claim 35, wherein the fault-related information is stored in a storage.

37. The computer-readable medium as recited in claim 32, further comprising the step of:
   (e) classifying and storing fault symptom information, inputted into the fault diagnosis-dedicated web-page by the operator, in a fault-symptom information database.

38. The computer-readable medium as recited in claim 32, further comprising the step of:

(f) classifying and storing embroidery-parts information of embroidery parts of the embroidery part configuring the embroidery machine in an embroidery-part information database.

39. The computer-readable medium as recited in claim 32, further comprising the step of:

(g) supporting a communication between the operator at the embroidery system and a manager at the server computer system.

40. The computer-readable medium as recited in claim 39, wherein the step (g) includes the step of:

supporting a chatting and a moving picture for the sake of the communication between the operator at the embroidery system and the manager at the server computer system so that the fault of the embroidery machine is diagnosed through a chatting and a moving picture.

41. The computer-readable medium as recited in claim 32, further comprising:

(h) registering an embroidery-part purchase request message and an embroidery fault diagnosis request message inputted by the operator, and registering a response message, with respect to the embroidery-part purchase request message and the embroidery fault diagnosis request message, to provide the operator with the response message.

42. The computer-readable medium as recited in claim 32, wherein the fault diagnosis-dedicated web-page includes:

a fault location search page for providing a fault part list when the operator selects an embroidery machine model name and a fault subject name;

a fault symptom providing page for providing a fault symptom list when the operator selects one fault embroidery-part in the fault part list and a search button on the fault location search page; and a fault diagnosis page for providing a fault diagnosis message when the operator selects one fault symptom in the fault symptom list and a check button on the fault symptom providing page.

43. The computer-readable medium as recited in claim 42, wherein the fault diagnosis-dedicated web-page includes:

a moving picture menu item for providing a moving picture of a fault processing accomplished by a manager at the server computer system.

44. The computer-readable medium as recited in claim 43, wherein the fault diagnosis-dedicated web-page includes:

a chatting menu item for providing a real-time chatting so that the communication between the operator and the manager is accomplished.

45. The computer-readable medium as recited in claim 43, wherein the fault diagnosis-dedicated web-page includes:

an e-mail menu item for providing an e-mail so that the operator can communicate with the manager.

46. The computer-readable medium as recited in claim 44, wherein the fault diagnosis-dedicated web-page includes:

an e-mail menu item for providing an e-mail so that the operator can communicate with the manager.

* * * * *